No. 704,750. Patented July 15, 1902.
H. LESLEY.
TANK FOR STORAGE BATTERIES.
(Application filed Feb. 8, 1902.)
(No Model.)
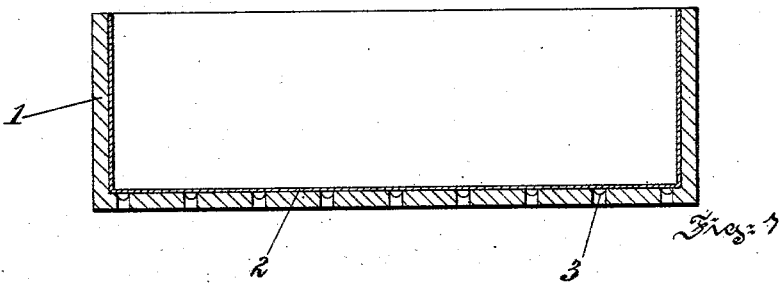
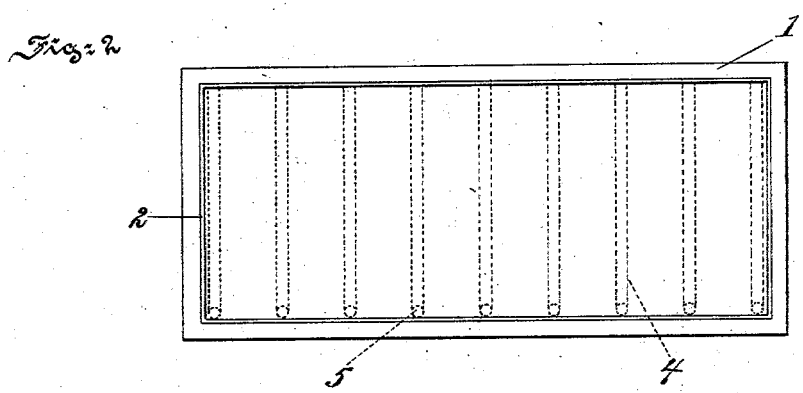
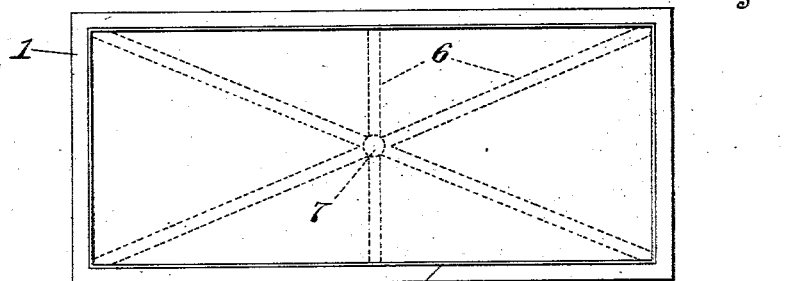
Witnesses:
Inventor.
Hugh Lesley
By Augustus B. Stoughton
Attorney

UNITED STATES PATENT OFFICE.

HUGH LESLEY, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

TANK FOR STORAGE BATTERIES.

SPECIFICATION forming part of Letters Patent No. 704,750, dated July 15, 1902.

Application filed February 8, 1902. Serial No. 93,118. (No model.)

*To all whom it may concern:*

Be it known that I, HUGH LESLEY, a citizen of the United States, residing at Philadelphia, in the county of Philadelphia and State of Pennsylvania, have invented certain new and useful Improvements in Tanks for Storage Batteries, of which the following is a specification.

It is customary to mount storage batteries in lead-lined tanks, and the acid solution or electrolyte sometimes—in fact, quite frequently—overflows or otherwise works its way between the lead lining and the tank and when in such position operates to deleteriously affect the tank as a whole. To avoid these defects and disadvantages is one object of the present invention, and this result is accomplished according to the invention by providing for the escape of such electrolyte as finds its way between the lead lining and the tank.

The nature, characteristic features, and scope of the invention will be more fully understood from the following description, taken in connection with the accompanying drawings, forming part hereof, and in which—

Figure 1 is a transverse sectional view of a lead-lined tank embodying features of the invention. Fig. 2 is a top or plan view illustrating a tank embodying a modification of the invention, and Fig. 3 is a similar view illustrating another modification.

In the drawings, 1 is the tank, and 2 is the lead or other lining. As shown in Fig. 1, the bottom of the tank is provided with openings, as 3, through which any electrolyte which finds its way between the tank and lining can escape.

In Fig. 2, 4 represents channels formed on the inner face of the tank and arranged to communicate with openings 5, so that the channels lead the electrolyte which may find its way between the lining and the tank to the openings 5.

In Fig. 3, 6 represents channels formed in the bottom of the tank, and they are shown as leading to and communicating with an opening 7 therein.

It will be obvious to those skilled in the art to which the invention relates that modifications may be made in details without departing from the spirit thereof. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. A lead-lined storage-battery tank having openings in its bottom which do not penetrate the lead lining, substantially as described.

2. A lead-lined storage-battery tank having channels between it and its lining and having an apertured bottom, substantially as described.

In testimony whereof I have hereunto signed my name.

HUGH LESLEY.

In presence of—
BRUCE FORD,
CARL SUDEN.